United States Patent Office 3,691,013
Patented Sept. 12, 1972

3,691,013
PROCESS FOR PRODUCING KETOSE
Shuzo Sakai, Toshio Miyake, and Yoshinori Sato, Okayama, Japan, assignors to Hayashibra Company, Okayama-shi, Okayama, Japan
No Drawing. Filed July 24, 1970, Ser. No. 58,146
Claims priority, application Japan, July 27, 1969, 44/59,262, 44/59,263
Int. Cl. C12b 1/00
U.S. Cl. 195—31 R        7 Claims

ABSTRACT OF THE DISCLOSURE

A process for producing ketose composed essentially of maltulose and maltotriulose by forming a sugar containing maltose and maltotriose as chief constituents from starch by the actions of α-1,6-glucosidase and β-amylase, isomerizing the aldoses with an alkaline solution, oxidizing the residual aldoses with a dehydrogenase, and then separating the acid thereby produced from ketose.

---

This invention relates to a process for producing ketose composed essentially of maltulose and maltotriulose, by forming a sugar containing maltose and maltotriose as chief constituents from starch by the action of α-1,6-glucosidase and β-amylase then isomerizing the aldoses (primarily maltose) with an alkaline solution next oxidizing the residual aldoses with a dehydrogenase, and then separating the acid thereby produced from ketose.

The present invention will be more fully described hereinafter. The first literature on the synthesis of maltulose, maltotriulose and the likes was introduced in 1953 when L. Hough et al. synthesized those saccharides through isomerization of aldose. Little literature has since appeared on the subject. Moreover, while the isomerization does not obviously proceed to a degree beyond 50 percent in an equilibrium state, no industrial process for the separation of unreacted matter and secondary reaction products has been developed. Having already developed an industrial process for oxidizing oligosaccharides such as maltose and maltotriose to bionic and trionic acids in good yields by an enzymatic reaction with lactose dehydrogenase the present inventors have now studied the possibility of applying that oxidation process to maltulose-maltose mixture so as to oxidize only the aldoses to bionic and trionic acids without losing the ketoses and then separating the acids either by ion exchange or in the form of basic calcium salts, and have finally established an industrially feasible process.

As regards the preparation of the starting material, maltose, the present inventors have also developed a process for decomposing starch with α-1,6-glucosidase far more advantageous than by conventional processes. By a combination of those techniques already developed, a process for producing ketose from starch on an industrial scale has now been established. The pure maltulose which has hitherto been produced only in small quantities as laboratory reagents and the mixture of maltulose and maltotriulose are now amenable to mass production. The present invention thus is of great significance in that it has opened up new possible applications for such saccharides as sweetening agents for foods and drinks, pharmaceuticals, and starting materials for industrial synthesizing processes.

The process of the invention will now be described step by step. First, maltose as the starting material is prepared, by either liquefying corn, potato starches or the like at a high temperature of 160° C. or upwards or continuously liquefying the starch with the addition of a liquefying enzyme or α-amylase at a high temperature between 85° and 90° C. thereby forming a low D.E. liquefied starch having a decomposition rate D.E. of about 1 to 5%, and then quickly cooling the liquefied starch to 50°–60° C., and simultaneously adding β-amylase and α-1,6-glucosidase, or, reversing the order and modifying the timing for the addition. In any way, high purity maltose having a maltose content of over 60% can be produced with ease.

The α-1,6-glucosidase which is employed for the purpose of this saccharification hydrolyzes the α-1,6-glucoside bond of the molecule of amylopectin that interrupts the β-amylolysis, thus permitting full performance of the β-amylose. The glucosidase which may be employed for the purpose of the invention is any of the enzymes produced by the strains of *Escherichia intermedia* (ATCC 21073), *Pseudomonas amyloderamosa* (ATCC 21262) and the like, the enzymes produced by some strains of the genus Nocardia and other Actinomycetes, and enzymes yielded by over a dozen strains belonging to the genera Agrobacterium, Azotobacter, Lactobacillus, Leuconostoc, Mycobacterium, Pediococcus, Sarcina, Serratia, Staphylococcus, Streptococcus, Bacillus, Micrococcus, Erwinia, etc., described in copending application S.N. 810,293, filed March 25, 1969.

The β-amylase which may be used is β-amylase extracted from wheat bran, β-amylase extracted from soy bean, or any other amylase from vegetable origin, or an enzyme produced by a microorganism such as Polymyxa (ATCC 8523), as described in the specification of British Pat. No. 1,130,398.

The reaction conditions are pH 5.5–6.0, temperature 45°–60° C. and reaction time 30–45 hours. The starch concentration is preferably between 10 and 25%. Although dependent upon the amount of enzyme and the reaction time used, the maltose thus obtained, and particularly a high-purity product, contains about 95% maltose and about 4% maltotriose. The smaller the maltose content, the larger the proportion of the maltotriose.

The isomerization from maltose to maltulose generally occurs in the presence of a basic catalyst, as has long been known as the Lobry de Bruyn reaction. It is an easy way of isomerizing aldose to ketose and, for that purpose, strong alkali, strong basic ion exchange resin or the like is employed. In the process of the present invention, calcium hydroxide, ammonium hydroxide, sodium hydroxide, or ion exchange resin was used. Regarding the reaction conditions, whether a combination of a low temperature and long time is used, or the opposite combination of an elevated temperature and short time is used, is importantly related to the equipment which is employed. At a low temperature below 40° C., the decomposition by oxidation of sugar is relatively small, but, with the rise of the temperature, the loss due to the oxidation and decomposition of the sugar is increased. With these results in view, tests were conducted with equipment capable of providing continuous rapid heating and rapid cooling and neutralizing. The results, as shown in the following table, indicate that the sugar loss increased with the rise of the temperature and the extension of the reaction time.

| Temperature: | Isomerization rate, percent, of test specimen and loss in parentheses (percent) after heating time of— | | | |
| --- | --- | --- | --- | --- |
| | 5 min. | 10 min. | 15 min. | 3 days |
| 35° C | | | | 45 (1) |
| 80° C | | 37 (1) | | |
| 100° C | 30 (1) | | 45 (5) | |

Ca(OH)₂ conc. 1.5% of sugar.
Sugar conc. 40%.

The reaction suitably proceeded with a sugar concentration of 20 to 40%, and where calcium hydroxide was used, a 0.13% solution was allowed to stand for 3 to 4 days, and the reaction was carried out until no more change was observed in optical rotation. Substantially the same results were obtained with sodium hydroxide and ammonium hydroxide.

When an elevated temperature was used, the reaction was effected with a 1 to 2% alkali solution and in the pH range of 9 to 10. In this case, a short-time reaction caused a sugar loss of only 1 to 2% and a good rate of isomerization although coloring was marked. The rate of isomerization was determined by the estimation of ketose with use of the cysteine-$H_2SO_4$-carbazole method. The isomerized sugar was quickly cooled and neutralized by injecting into a flash chamber with an equivalent amount of hydrochloric acid or dilute sulfuric acid, the flash tank being kept at a reduced pressure. The calcium sulfate produced was removed by filtration, and the sodium chloride and ammonium sulfate were directly used for subsequent culture or enzymatic reaction. The colored matter was obtained in a fairly high concentration, and the de-coloring was effected by passing the matter through a layer of granulated charcoal.

The paper chromatogram of the purified solution showed that maltose, maltotriose, and a small amount of tetraose were left in a combined residual amount of at least about 50 percent. As ketose, there were observed maltulose, maltotriulose, and tetraulose. The solution upon purification with active charcoal and ion exchange resin became a very sweet sirup and was usable as a sweetening agent.

The method of employing a strong basic ion exchange resin for the epimerization of aldose was such that Amberlite IRA-400 was used for the ion exchanger and the sugar solution was boiled to remove oxygen and then cycled at 70° C. until the isomerization proceeded. Isomerization to a degree of about 30 percent was possible in 5 hours. The solution was then purified by the same treatment as above described.

In separating the aldose and ketose from the mixed solution, the purpose could be satisfactorily realized by the enzymatic oxidation of the aldose. To attain this end, the mixed sugar solution is enzymatically oxidized by either culturing a strain of genus Pseudomonas on the saccharides obtained above as the carbon source or using the bacterial cells obtained by the cultivation as an enzymatic source. When a Pseudomonas strain was cultured with aeration on a 5-10% sugar solution containing a nitrogen source such as corn steep liquor and some inorganic salts, ketoses are little oxidized while aldoses such as disaccharide and trisaccharide are oxidized to aldonic acids, i.e., maltobionic acid and maltotrionic acid, respectively.

As regards the enzyme-producing strains which may be used for the above purpose, *Pseudomonas graveolens* NRRL 14 and *Pseudomonas fragi* NRRL 25, both reported by Frank H. Stodola et al. in J. Biological Chemistry, Vol. 171 (1947), pp. 213–221, are most preferable. Other Pseudomonas strains which do not involve the hydrolysis of disaccharide may also be employed although they extend the reaction time.

Alternatively, the bacterial cells obtained by the cultivation above described are added to the 20–30% mixed sugar solution, and the mixture is oxidized by aeration and agitation while the drop of the pH value is being prevented in the presence of calcium carbonate and other additives. In this manner the residual disaccharide and trisaccharide can be oxidized to aldonic acids without any loss of the sugar. The reaction time ranges from 10 to 20 hours, and the degree of oxidation according to the invention was determined by measuring the amount of calcium salt of the aldonic acid produced.

The reaction product or aldonic acid-ketose mixture can be divided into the components by adsorption on a weak basic ion exchange resin taking the advantage of the acidity of aldonic acid. Or, the aldonic acid can be crystallized and separated out as a calcium salt or basic calcium salt. To illustrate the procedure in more detail, the mixed solution is purified and concentrated, and the concentrated sirup thus formed is dissolved in calcium hydroxide for its pH to show slightly alkine, so that a basic calcium salt is precipitated. The crystals produced are collected, washed, decomposed with sulfuric acid and the resulting calcium sulfate is removed. The residual sulfate (sulfuric) radical is eliminated with a small amount of barium salt. The product is desalted and purified with a cation exchange resin.

The aldonic acid adsorbed on an anion exchange resin is desorped off with calcium hydroxide or sodium hydroxide, and the effluent aldonate is purified with a strong acidic ion exchange resin to pure aldonic acid.

The ketose-aldonic acid mixture, when purified with active carbon and a strong acidic ion exchange resin, becomes a sweetening agent having some sourness, which may be used as food additive.

The ketose solution after the removal of the acid therefrom, the mother liquor and the washing or non-adsorped fraction, is decolored by active carbon, desalted and deacidfied using anionic and cationic exchangers, and concentrated to sirup in order that maltulose can be obtained.

The properties of the ketose sweetening agent obtained by this invention as a food additive were studied and the following results were obtained.

(1) Sweetness

Sweetness test showed that this sweetening agent is slightly less sweet than ordinary sugar but sweeter than grape sugar. As for the quality of the sweetness, it is milder than sugar but has more "body" or "depth" than grape sugar, owing to the complex structure composed of several saccharides.

In a panel test conducted by 30 examiners, ordinary sugar, grape sugar, maltitol, and the ketose of the sweetening agent of this invention were compared in terms of the intensity of sweetness. By the pair test method, each test material was repeatedly tested 5 or more times. When compared in different sugar concentrations of 35%, 20%, and 10%, the test materials were ranked in the following order of decreasing sweetness:

Ordinary sugar > ketose ≑ maltitol > grape sugar

Thus, ketose is ranked between ordinary sugar and grape sugar and is practically on the same level as maltitol.

For the comparison of the strength of sweetness, a 35% solution of ketose was compared with sugar solutions in different concentrations of 10%, 15%, 20%, 25%, and 30%. The results indicated that the 35% solution of the ketose of the invention is substantially as sweet as the 25% sugar solution.

(2) Crystallizability and crystallization-inhibiting properties

The maltulose sweetening agent of the invention is freely soluble in water, and is only slightly crystallizable in high concentrations at normal temperature.

In a test final 10 percent on dry basis of this ketose sweetening agent was added separately to sugar and grape sugar thereby forming 70% solutions, and those solutions were allowed to stand at room temperature. In contrast to the sugar and grape sugar solutions which, without the addition of the sweetening agent, began to crystallize after the lapse of one night, the sugar solutions containing the sweetening agent did not crystallize at all.

(3) Moisture- and flavor-retaining properties and viscosity

Since the sweetener of the invention is a ketose mixture consisting of maltulose, maltotriulose, and minor proportions of higher ketoses, it has an excellent moisture-retaining property. It retains flavor, and has somewhat greater viscosity than cane sugar because it contains some proportions of tri- and tetra-saccharides. With these features, it is best adapted for applications as a food additive. It proves particularly useful in the making of sponge cakes, and its viscosity and flavor-retaining property combinedly impart fresh flavor and unique palatability to canned fruits, fruit juices, etc.

(4) pH stability test

Final sugar concentration _____percent__ 0.02
Buffer solution, final 0.02 M, pH _____ 2.0–10.0
Temperature _____° C__ 98

After sampling at predetermined intervals of time, changes in the amounts of direct sugar and total sugar were determined in conformity wtih the Somogyi-Nelson method. On the basis of the initial concentration which was regarded as 100, the changes in concentration were recorded.

The changes in total sugar content were determined by the Somogyi-Nelson method after adding 0.5 ml. of 5% HCl to each milliliter of the reacted solution, heating the solution at 100° C. for 45 minutes, and neutralizing the resultant wtih 0.5 ml. of NaOH, the amount thus obtained being considered as the total sugar content.

| pH value | | | Heating time (hours) | | | | |
|---|---|---|---|---|---|---|---|
| Initial | 12 hrs. later | | 1 | 2.5 | 5 | 8 | 12 |
| 2 | 2.3 | Direct | 100 | 101 | 102 | 103 | 105 |
|   |     | Total  |     | 100 | 99.7 | 99.7 | 100 |
| 4 | 4.3 | Direct | 100 | 100 | 99.7 | 100 | 100 |
|   |     | Total  |     | 100 |      | 99.7 | 100 |
| 6 | 6.0 | Direct | 100 | 101 | 100  | 101 | 101 |
|   |     | Total  |     | 99.7 |    | 93.0 | 92.3 |
| 8 | 7.3 | Direct | 100 | 102 | 103  | 103 | 103 |
|   |     | Total  |     | 99.7 | 99.1 | 96.5 | 96.7 |

As is clear from the above table, the sweetening agent of the invention with an acidity of pH 2 is hydrolyzed only a few percent upon heating at 100° C. for 12 hours, but on the alkaline side with pH values of over 7, it becomes instable with the decomposition of the component saccharides themselves, like general sugars.

As has been described above, the sweetening agent of the invention is suitable as such for various soft drinks. With plain sweetness it harmonizes with various carbonated drinks such as colas, aerated cider-like drinks, and lemonades, and gives refreshing after-tastes to those drinks. It also imparts "calpis," yogurt and other lactic acid drinks with sweetness well matched with the sourness of the drinks themselves. It further enables natural and synthesized fruit juices, concentrated fruit juices, tomato juice and tomato ketchup, etc. to retain their flavors of fruits, fresh tastes and sophisticated sweetness in a most desirable way. In addition, the sweetening agent adds suitable viscosities of those drinks without the possibility of crystallization even in highly concentrated juices.

For the reasons above enumerated, the sweetening agent is most advantageously utilized in the preparation of ice candies such as ice cream and in the sweetening of canned fruits.

When used in the making of various pastries and wet cakes, the sweetening agent proves advantageous with its low crystallinity, refined sweetness, moisture-retaining property and other desirable properties. It imparts adequate moisture and avoids drying of sponge cakes and the like to which ageing or drying and crystallization of sweetening additives can be ruinous. Those properties are coupled with the non-crystallization of the agent in a high concentration to make the present sweetening agent a most suitable one for these applications.

It gives optimum luster and tint to baked cakes, cookies, biscuits, and the like. Its moisture-retaining quality prevents deformation on baking and also any loss in the yield due to cracking. The agent thus retains the flavors and extends the life of foodstuffs.

It keeps jellies palatable, stabilizes the color, and maintain the clearness, while preventing drying and separation of crystals, for prolonged periods of time. Thus, jellies are kept in fresh state throughout their life. Cream cakes are likewise imparted with sophisticated sweetness and softness to the palate by the addition of the present sweetening agent.

When blended into hard candies, centers of chocolate balls, chewing gums, caramels, and various forms of chocolate, the sweetening agent of the invention moderates their excessive sweetness, improves their after-tastes, and makes them better adapted for the modern palate.

Still another application is in the field of alcoholic beverages; small proportions of the sweetening agent of the invention added to various wines and alcoholic drinks noticeably increase their savoriness and "body."

EXAMPLE A.—PROCESS FOR PRODUCING KETOSE

Example A–1

Starch slurry of sweet potato in a concentration of 20% and at pH 6.0 was liquefied at 90° C. by the addition of 0.2% of a liquefying enzyme per gram of the starch. A homogeneous liquefied starch with a decomposition rate of 3.5% was obtained. This liquefied starch was rapidly cooled to 50° C., β-amylase (British Pat. No. 1,130,398) and α - 1,6 - glucosidase obtained from an Escherichia strain (Escherichia intermedia ATCC 21073) were added in amounts of 20 and 10 units, respectively, per gram of the starch, and the liquefied starch was saccharified at 45° C. and pH 6.0 for 35 hours. After the deactivation of the enzymes, the resultant was decolorized and purified with active carbon, and a sugar solution with a maltose purity of 93 percent on dry basis resulted. Purification of the maltose thus obtained was performed by crystallization.

Two kilograms of this maltose was dissolved in 10 liters of water and, after the addition of 13 g. of calcium hydroxide, the mixture was reacted at 35° C. for 4 days. The optical rotation of the reacted solution was determined and when the value was stabilized the reaction was terminated and the resultant was concentrated in vacuum. It had a maltose content of about 52 percent. One half of this mixed solution was put aside, and one liter of a solution containing 10 percent of the reaction product as an anhydride basis was neutralized with $CO_2$. Into this solution were dissolved 1% corn steep liquor, 0.2% urea, 0.06% potassium dihydrogen phosphate, 0.025% epsom salt, and 2.5 g. calcium carbonate. The mixture was sterilized with heat and inoculated with Pseudomonas graveolens IFO 3460, which was cultured with stirring at 400 r.p.m. and aeration with an equivalent amount of air at 30° C. for 50 hours. From the culture fluid the bacterial cells were centrifugally collected and used as an enzyme source.

The enzymatic activity was determined in the following way. Two hundred μmole of a phosphate buffer (pH 5.6), 20μmole of maltose, 0.5 μmole of 2,6-dichlorophenolindophenol, and the sonicate of bacterial cells in a total volume of 6.0 ml. were mixed and reacted at 30° C. for 10 minutes. Activity was measured following the decrease in absorbance at 590 mμ. And one unit of enzyme was defined as the amount which gives decrease of absorbance of 0.001 in a minute.

The culture fluid freed from the bacteria following the cultivation was purified by decoloration and filtration through active charcoal, concentrated, added to a solution saturated with calcium hydroxide, and while the solution was hot the aldonic acid was precipitated and removed in the form of basic calcium aldonate. The filtrate was freed from the calcium by means of a strong acidic ion exchange resin and, using a slightly basic anion exchange resin (Amberlite IRA 64), the residual bionic acid was removed. Then, it was purified with different ion exchange resins, i.e., strong basic IRA 411 and strong acidic IR 120, to a colorless liquid and concentrated sirup. Analysis by paper chromatography showed that the sirup contains 95% maltulose, 1% maltotriulose, 1% maltose, 2% maltotriose, and the balance some other oligosaccharides. The yield was 45 percent on the basis of the amount of the maltose.

The bionate separated as an insoluble calcium salt was dissolved in five times by volume of water and, by the gradual addition of dilute sulfuric acid, the calcium was precipitated as calcium sulfate and removed. By means of a cation exchange resin (IR 120) the residual calcium was eradicated, and using a moderately basic ion exchange resin the sulfuric radical was absorbed away. The resulting solution was concentrated in vacuum, and maltobionic acid was obtained in a sirupy state. The yield was 41 percent on the basis of the maltose amount used. Paper chromatography indicated that this bionic acid contained small amounts of maltulose, maltose, maltotriose, and also maltotrionic acid, while maltobionic acid accounted for more than 95 percent of the total amount.

Example A–2

In the same manner as described in Example 1, *Pseudomonas amyloderamosa* (ATCC 21262) was cultured, and the α-1,6-glucosidase thereby produced was used in preparing a maltose sirup (maltose purity 92%). One liter of a solution of the sirup in a concentration of 15 percent was reacted with 200 ml. of ammonium hydroxide having a specific gravity of 0.88, at 35° C. for 4 days. When optical rotation became stable and constant, the solution was neutralized with sulfuric acid to pH 5.8. Following the addition of 0.5% corn steep liquor, 0.06% potassium dihydrogen phosphate, and 0.025% magnesium sulfate, the mixture was sterilized and inoculated with *Pseudomonas fragi* (NRRL 25). In the same way as in Example 1, aeration of the culture was carried out while adjusting the pH with calcium carbonate. The culture fluid was concentrated, precipitated calcium sulfate was removed, and the fluid was cooled. The aldonic acid produced was crystallized and precipitated as a basic calcium salt, the precipitate was centrifuged off, and was washed out with a small amount of water. The mother liquids and washings were decolored altogether with active carbon, and the resultant was concentrated and purified by ion exchange. In the form of a lightly yellowish sirup, 35% yield for maltose was obtained.

The calcium precipitation of maltobionic acid was effected in the same manner as described in Example 1 and, after the precipitation and removal of most of the calcium by means of sulfuric acid, metallic ions were removed by purification with an ion exchange resin. An aldonic acid sirup was obtained in a yield of 45 percent on the basis of the amount of maltose used.

Example A–3

The maltose obtained in accordance with Example 1 was diluted to 2 liters of a solution with a 15% concentration, and the solution was reacted, with the addition of 2.0 g. of calcium hydroxide, at 35° C. for 3 to 4 days. After the conclusion of the reaction, the reacted solution was neutralized with carbon dioxide gas, decolored with active carbon, and 37 g. of calcium carbonate was added to a liter of the solution. With the further addition of 5 g. of the bacterial cells obtained in Example 1, the solution was vigorously agitated with aeration at 30° C. for 15 hours. Thereafter, the reaction was terminated, and the bionic acid produced was precipitated and separated in the form of a basic calcium salt in the manner described in Example 1, and the filtrate that contained maltulose was decolorized and desalted with an ion exchange resin. From the liquid upon concentration, 150 g. of a sweet sirup was obtained. The yield in terms of an anhydride was 47 percent. The composition contained a few percent of maltotriulose. The maltobionic acid separated as a calcium salt was freed from calcium and decolorized in the same manner as in Example 1. The yield of maltobionic acid which contained maltotrionic acid was 45 percent.

Example A–4

Purified corn starch in the form of a 20% starch slurry was continuously liquefied at 160° C. After a hold time of 20 minutes, a liquid with a dextrose equivalent of 2.5% was obtained. This liquefied starch was rapidly cooled to 60° C., and with the addition of β-amylase at a rate of 20 units per gram of the starch the mixture was agitated. When the viscosity was decreased, the liquid was cooled to 45° C., α-1,6-glucosidase of Lactobacillus (ATCC 8008) was added at a rate of 20 units per gram of the starch, and then with pH 6.0, the mixture was saccharified at 45° C. for 30 hours. On completion of the saccharification, the enzymes were deactivated by boiling and the resultant was desalted and purified with active carbon and ion exchange resin. Analysis of the product as concentrated showed that it comprised 80% maltose, less than 15% maltotriose, and minor proportions of tetraose and pentaose.

The maltose sirup thus obtained was adjusted to a concentration of 50 percent and also to a pH value of 10 with caustic soda, and then isomerized by heating in a continuous apparatus at 95° C. for 5 minutes. The reacted solution was neutralized with hydrochloric acid while being rapidly and continuously cooled. The resultant was passed through a 4 meter-thick layer of granulated active charcoal for decoloration and was desalted by ion exchange, when a lightly yellowish sirup resulted.

This isomerized sirup contained 45% maltulose and was also found by paper chromatography to contain maltotriulose or tetraulose and some other unknown substances.

To a 10% solution of this ketose mixture, calcium carbonate was added in an amount of 2.5% on the basis of the amount of the solution. Also, as a dehydrogenase, the bacterial cells obtained in accordance with Example 1 were added at a rate of 200 mg. per 10 g. of the saccharides. The mixture was agitated with aeration at 30° C. for 40 hours, but there was practically no trace of an aldose reaction. The reacted solution was decolorized with charcoal, filtered, decationized with a cation exchange resin, and adsorbed on a weak or moderate basic ion exchange resin. The deacidified ketose- equivalent solution was further decolorized and concentrated in vacuum to a sirupy state, in a yield of 45 percent on the basis of the amount of the starting material. Paper chromatography showed that the product contained as the ketose content some triulose and tetraulose in addition to maltulose, and it also contained a very small amount of aldose.

The bionic acid, trionic acid, etc, adsorbed on the ion exchange resin were driven out with dilute sulfuric acid, and the resultant was neutralized with calcium hydroxide, decolorized with active charcoal, and concentrated. As much sulfuric acid as possible was precipitated and removed by means of barium chloride, and the remaining liquid was purified with a cation exchange resin, when a colorless sirup was obtained. The yield was 41 percent of the amount of the starting material maltose.

Example A–5

The maltose solution prepared by the procedure of Example 1, in the form of a 20% solution, was boiled to remove air. With a large amount of Rohm and Haas' Amberlite IRA 400 added, the flow rate of the solution was dropped and the solution was passed through SV 1. The temperature was adjusted to 70° C. and the resultant was heated for over 5 hours, when it attained an isomerization degree of 35 percent. This saccharide solution was purified through a mixed bed of ion exchange resins Amberlite IR 120 and IRA 411, and then was concentrated. The sirup thus obtained was very sweet and suitable for use as a sweetening agent.

Using a part of this saccharide solution and also the bacterial cells of the Pseudomonas strain obtained in accordance with Example 1, the same treatment as described in Example 3 was carried out to obtain a mixed Ketose-aldonic-acid solution. After the same separation treatment as in the preceding examples, a mixture of maltulose and maltotriulose was obtained in a yield of 30 percent. In terms of aldonic acid, the yield was 45 percent.

EXAMPLE B.—PROCESS FOR PRODUCING FOODS AND DRINKS

Example B–1.—Preparation of carbonated drink

Of carbonated drinks, aerated cider-like drink was chosen for the object of this example. A condiment mixture of the following composition was prepared in the respective amounts per 10 liters of the drink to be obtained:

| | |
|---|---|
| This sweetening agent (maltulose 90% as anhydride) _____g__ | 700 |
| Saccharin _____g__ | 12 |
| Sodium chloride _____g__ | 2 |
| Citric acid, etc. _____g__ | 60 |
| Flavoring _____ml__ | 50 |

This blended solution was completely dissolved, filtered, and carbonated in the usual manner. Thus, a plain and sweet refreshing drink was obtained as bottled. The sweetening agent of the invention added refined and deep sweetness in good harmony with the sourness and artificial sweetness, and imparted lightness and coolness to the after-taste of the drink.

Example B–2.—Preparation of concentrated fruit-juice drink

Ingredients of the following proportions were used in preparing 1,000 liters of a concentrated juice which contained orange juice. A composition of 79 liters of 5-fold concentrated orange juice, 750 liters of a 60% solution of a sweetening agent of the invention (which contained 87% maltulose), 40 kg. of citric acid, 5 liters of orange base, and 2.5 liters of orange essence, was diluted with water to a total volume of 1,000 liters.

The maltulose-based sweetening agent of the invention harmonized well with the orange and supplied sweetness which made the inherent sourness and flavor of the fruit all the more profound. Since the maltulose sweetener contains small proportions of higher ketoses and is difficult to crystallize, a clear concentrated juice several times as dense as the normal concentration is obtained without the possibility of crystal deposition.

Example B–3.—Preparation of canned mandarine orange

Sirup for canned mandarine orange was prepared from 60 kg. of a maltulose sweetener of the invention (maltulose purity 85% and water content 20%), and 30 g. of saccharin diluted altogether with water to a total weight of 100 kg. The orange was peeled and naked in sectors, immersed in the sirup, and the cans were sealed and a sterilizing treatment was performed by the usual method. The maltulose, maltotriulose and other oligosaccharide-containing constituents of the sweetener of the invention had sufficient viscosity to give adequate luster to the fruit, and mild sweetness of the agent harmonized with the sourness of the orange, emphasized and maintained the natural flavor of the fruit. The osmotic pressure was low and the yield of the product was satisfactory.

Example B–4.—Tomato ketchup

Tomato was pulped, strained, and concentrated to 40–50%. The resulting puree was blended with the following ingredients to be an end product. To 10 liters of the puree were added 800 g. (on the anhydrous basis) of a sweetening agent of the invention (consisting of 90% maltulose and 10% higher saccharide ketose), 100 g. of sodium chloride, 100 ml. of a 30% acetic acid solution, 50 g. of onion, 2 g. of all-spice, 5 g. of cloves, 12 g. of cinnamon, 2 g. of mace, and 1.0 g. of cayenne-pepper. The mixture was concentrated to an overall specific gravity of 1.128. This product underwent no change in color but retained clear tint and luster throughout the period of storage. The sweetness was mild, and the sweetening agent of the invention harmonized well with a enhanced flavor of fresh tomato.

Example B–5.—Preparation of ice cream

The sweetening agent of the invention is suitable for the making of cold refreshments such as ice cream, ice milk, ice sherbet, and ice cake. Here the use of the sweetening agent in the preparation of ice cream is described as an example. Fifty parts of fresh milk was mixed with 15 parts of fresh cream having a fat content of 45%, 30 parts of condensed skim milk, 5 parts of a sweetener of the invention (purity 85% maltulose and 25% maltotriose, etc.), and 0.5 part of sodium alginate as an emulsifier-stabilizer. The mixture was dissolved to a homogeneous state and melted at 50° to 75° C. At 60° to 65° C. the mixture was filtered to remove foreign matter therefrom, and then the fat was uniformly dispersed and the over run was increased by the use of a homogenizer. The resultant was pasteurized at 70° C. for 30 minutes, cooled, and kept at a low temperature of 3° to 5° C. for ageing, and then finished on a freezer to a final product. The product had a refined sweetness suitable for a cold refreshment, a relatively high melting point due to the high molecular weight, and good over run. All told, the product obtained had very good flavor and palatability.

Example B–6.—Preparation of "Castella" sponge-cake

So-called "Castella" sponge-cake is considered to be a product of sugar and egg with a minor proportion of wheat flour, which depends on the kind of sugar for the unique taste and the spongy structure. In one exemplary composition, 100 g. of a sweetener of the invention (80% maltulose and 20% maltotriulose and oligosaccharides), 1,000 g. of egg, 500 g. of wheat flour, and 50 g. of honey were thoroughly mixed and a dough was formed in the usual manner. It was then introduced into a cardboard box placed on an iron plate and was baked in an oven at 180° to 190° C. to a suitable color. The ketose content of the sweetner gave a particularly desirable tint on baking. The product was uniform and fine in texture, and retained the elasticity and moisture unchanged for a long time. It was somewhat moist and soft to touch. Thus, not only drying due to ageing is completely precluded but also the flavor which has usually been improved by the addition of a starch sirup, honey, or the like is increased even to a greater extent by the addition, instead, of the maltulose in accordance with the present invention.

Example B–7.—Making of biscuits

Regarding the manufacture of biscuits, soft biscuits of the type which is available most abundantly in the market is cited as an example. The material composition was such that 100 parts of low-power wheat flour, 6 parts of starch, 40 parts of a sweetener of the invention (85% maltulose, 10% maltotriulose, and 20% water), 15 parts of condensed milk, 10 parts of butter, 10 parts of shortening oil, 8 parts of eggs, 0.3 part of sodium chloride, and 0.5 part of an expanding agent were dissolved in succession, in the order of the sweetener, wheat flour and so forth, in a suitable amount of water and kneaded on a mixer. As soon as complete mixing was attained, the mixer was stopped and the mixture was obtained with a softness like that of an ear-lobe. It was immediately passed through a stamping machine, and the pieces so stamped out were fed into a baking oven. The inlet and outlet temperatures of the oven were set at 270° C. and 130° C., respectively, and each cycle of baking was completed in 10 minutes. The product had uniform luster and shape, and was light and dry to touch. It was crisp to the tongue and had evenness and smoothness to dissolve readily in the saliva.

The sweetness was light and was free of any thickness. The oligosaccharide content of the sweetening agent used as an ingredient gave a product which had luster without the addition of starch sirup as usual.

Example B-8.—Preparation of sweet fruit jelly

As an exemplary composition for a strawberry jelly, 800 kg. of a sweetener of the invention (maltulose purity 86% and 80% on the dry basis), 11.4 kg. of condensed fruit juice (concentrated to one-hundredth and containing 0.121 kg. citric acid), and 10.0 kg. of pectin (a 4% aqueous solution) were used. A hot sirupy solution of this sweetener was prepared and, while it was kept at a constant temperature, a pectin solution and a depectinized fruit juice were added, and then the whole mixture was kept at 80° C. After the adjustment of the pH with jelly to 3.1, the resultant was concentrated in vacuum and finished at 103° C. According to a conventional process, it is difficult to produce a jelly without using sugar in an amount of more than half of the product, and this makes the product too sugary. The sweetener of the invention, on the other hand, provides a mild sweetness and is most suitable to the modern palate.

With the sweetener of the invention, jellification can be accomplished in an optimum way with little possibility of decomposition of maltulose by acid and no possibility of crystal separation by acid.

Example B-9.—Butter cream

Eleven hundred grams of a sweetening agent of the invention (consisting of 85% maltulose and 15% maltotriulose and oligosaccharides) was dissolved in a suitable amount of water, boiled down to a sirup at 105° C., cooled, and then slowly poured into fat (1000 ml. of shortening) being agitated in a mixer. When the mixture attained a smooth and lustrous surface, it was finished with small amounts of flavoring and liquors to an end product. This product was very smooth to the mouth, mild in sweetness, and proved highly harmonious with the base of decoration cake, etc.

Example B-10.—Custard cream

One thousand grams of corn starch was mixed with 1,900 g. of a maltulose-based sweetener of the invention and 8 g. of sodium chloride. With the addition of 2,800 g. of eggs, the mixture was stirred. With agitation, 10,000 ml. of boiling milk was gradually introduced, and the mixture was stirred on a slow fire. When the whole mixture became translucent with complete gelatinization of the starch, it was cooled and flavoring was added. The product was not too sugary but retained a stable, smooth state for long, so that it could be used on various types of cakes.

Example B-11.—Hard candies

As an example of hard candies, drops were made in accordance with the present invention. Sixty percent of granulated sugar and 20 percent of starch sirup were dissolved in water to form artificial honey. With the addition of 2.0 percent of a sweetening agent of the invention (consisting of 90% maltulose and 10% maltotriulose, etc.), the sweet mixture was boiled down in a vacuum boiler to a water content of 1 to 1.5% at 130° C. It was cooled, and kneaded well with 0.8% of citric acid and also with some color and flavoring. At a temperature of about 80° C., the dough was shaped through pressure rolls and then shieved to obtain an end product. In the product the strong sugariness was moderated by the addition of the special sweetener to a refined sweetness. The product had improved luster and was protected against crystal separation.

Example B-12.—Preparation of chocolate ball centers

The product boiled down to the state as described in the immediately preceding example was no longer heated at a slightly lower temperature than in the above example. It was kneaded with flavoring, color, citric acid, etc. on a mixer and, in the form of a sticky jelly, molded to small pieces and cooled, or while still hot, the small balls were allowed to expand under reduced pressure to the form of balls. In either case, the resulting balls were coated with chocolate. The centers thus obtained were plain and not thickly sweet. In good harmony with chocolate, the centers formed the basis of excellent products.

Example B-13.—Preparation of sweetened condensed milk

Raw milk with a controlled fat content was instantaneouly pasteurized at 110° to 130° C., roughly boiled and, with the addition of a sweetening agent of the invention (containing 90% maltulose) in an amount of 15% of the raw milk, the milk was concentrated, and then the resultant was cooled to a temperature below 15° C. and treated for minute division of the lactose crystals. Because the maltulose-containing sugar has an inhibitory action against crystallization, the lactose was kept from crystal deposition and finely divided to a uniformalized state. One example of the recipe was 25% water, 29% total milk on dry basis, 7% fat, 7% protein, 14% lactose, 1.5% ash, and 45% the sweetener of the invention.

The condensed milk obtained in this manner had good color and luster, adequate viscosity, and a well dispersed fat content. The lactose in the form of finely pulverized crystals was pleasant to the palate and negligible in the caloric value.

It will be obvious to those skilled in the art that various changes may be made without departing from the scope of the invention and the invention is not to be considered limited to what is described in the specification.

What is claimed is:

1. A process for producing maltulose containing small amounts of maltotriulose, comprising:
   preparing high-purity maltose containing small amounts of maltotriose;
   isomerizing said high purity maltose in an alkaline aqueous solution to form the ketose maltulose containing small amounts of the ketose maltotriulose;
   converting the unreacted high-purity maltose to aldonic acid by oxidizing by means of a lactose dehydrogenase; and
   separating the aldonic acids from the ketoses by adsorption or precipitation as an insoluble basic complex,
   thereby leaving substantially pure maltulose.

2. A process in accordance with claim 1 wherein said conversion to aldonic acids is carried out by means of culture bacteria productive of a lactose-dehydrogenase.

3. A process according to claim 1 in which *Pseudomonas graveolens* NRRL 14 and *Pseudomonas fragi* NRRL 25 are used as lactose dehydrogenase producing strains, and said converting step is performed with any of these lactose dehydrogenases.

4. A process according to claim 3 wherein said lactose dehydrogenase producing strains are cultivated on a medium containing isomerized maltose and maltotriose and the thus cultivated cells are separated from the culture broth for use in said converting step.

5. A process according to claim 1 in which said converting step is performed with cells obtained by cultivation of strains productive of lactose dehydrogenase on any medium suitable for cultivation of strains of Pseudomonas genera.

6. A process in accordance with claim 1 wherein said high-purity maltose is prepared from liquid starch by the actions of β-amylase and α-1,6-glucosidase.

7. A process for the production of ketoses and aldonic acids comprising the steps of:
- preparing high purity maltose containing small amounts of maltotriose;
- isomerizing said high-purity maltose in an aqueous solution to form the equivalent ketoses; and
- converting the unreacted high-purity maltose to the equivalent aldonic acids by oxidizing by means of a lactose dehydrogenase;
- whereby the ketoses remain substantially uneffected by said converting step and a mixture of ketoses and aldonic acids is achieved.

References Cited

UNITED STATES PATENTS 3,565,765   2/1971   Heady et al. ---------- 195—31

OTHER REFERENCES

Stanek et al., "The Oligosaccharides," pp. 104–5, 1965, published by Academic Press.

Stodola et al., "J. Biol. Chem.," vol. 237, pp. 2721–1947.

Nishizuka et al., "J. Biol. Chem.," vol. 237, pp. 2721–28, 1962.

A. LOUIS MONACELL, Primary Examiner

G. M. NATH, Assistant Examiner

U.S. Cl. X.R.

95—47; 99—141